United States Patent
Pockrandt

(10) Patent No.: US 6,236,591 B1
(45) Date of Patent: May 22, 2001

(54) METHOD FOR RELIABLY CHANGING A VALUE STORED IN A NONVOLATILE MEMORY, AND CIRCUIT CONFIGURATION FOR THIS PURPOSE

(75) Inventor: Wolfgang Pockrandt, Reichertshausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/597,349

(22) Filed: Jun. 19, 2000

Related U.S. Application Data

(63) Continuation of application No. PCT/DE98/03715, filed on Dec. 17, 1998.

(30) Foreign Application Priority Data

Dec. 19, 1997 (DE) .............................. 197 56 895

(51) Int. Cl.$^7$ ................................... G11C 16/06
(52) U.S. Cl. .............................. 365/185.09; 365/185.17; 365/189.04
(58) Field of Search ................. 365/185.09, 185.17, 365/189.04

(56) References Cited

U.S. PATENT DOCUMENTS

| | | | |
|---|---|---|---|
| 4,939,690 | * | 7/1990 | Momodomi et al. ............. 365/185 |
| 5,383,162 | * | 1/1995 | Shirai et al. ..................... 365/231 |
| 5,515,324 | * | 5/1996 | Tanaka ........................ 365/185.09 |
| 5,576,989 | | 11/1996 | Kowalski ..................... 365/185.09 |
| 6,122,193 | * | 9/2000 | Shibata et al. ............... 365/185.03 |

FOREIGN PATENT DOCUMENTS

| | | |
|---|---|---|
| 36 38 505 | 5/1988 | (DE) . |
| 0 398 545 | 11/1990 | (EP) . |
| 0 448 118 A2 | 9/1991 | (EP) . |

OTHER PUBLICATIONS

Published International Application No. WO 96/10810 (Schrenk), dated Apr. 11, 1996, as mentioned on p. 2 of the specification.

* cited by examiner

*Primary Examiner*—Vu A. Le
*Assistant Examiner*—Tuan T. Nguyen
(74) *Attorney, Agent, or Firm*—Herbert L. Lerner; Laurence A. Greenberg; Werner H. Stemer

(57) ABSTRACT

A method for reliably changing the value of a data medium having at least two volatile memory areas for storing a currently valid value. Each memory area has at least one associated nonvolatile control memory cell whose state defines the currently valid memory area. The current value is first written to an invalid memory area. A previously valid memory area and the associated control memory cell are then erased simultaneously and the control memory cell for the memory area to which information had previously been written is programmed, likewise simultaneously, so that the latter memory area can be recognized as the valid memory area.

2 Claims, 1 Drawing Sheet

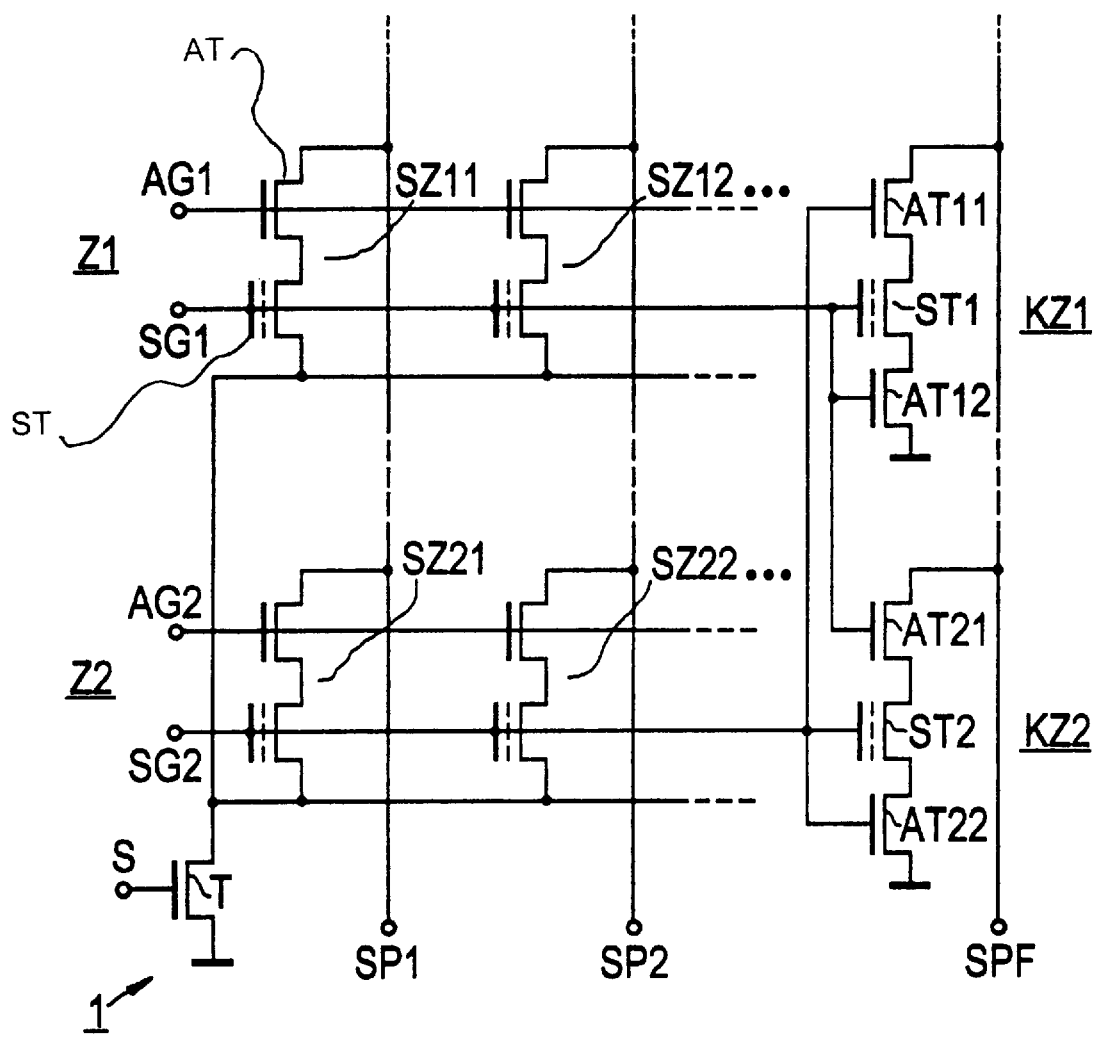

METHOD FOR RELIABLY CHANGING A VALUE STORED IN A NONVOLATILE MEMORY, AND CIRCUIT CONFIGURATION FOR THIS PURPOSE

CROSS-REFERENCE TO RELATED APPLICATION

This is a continuation of copending International Application PCT/DE98/03715, filed Dec. 17, 1998, which designated the United States.

BACKGROUND OF THE INVENTION

Field of the Invention

At the present time, diverse applications are being used in which values, represented by a counter reading, for example, are recorded in a nonvolatile form. The values are preferably stored in read-only memories, such as EPROMs, EEPROMs and flash EPROMs, i.e. in memories which can be erased and can have information written to them again. The memories and the circuits determining the value, and also circuits that control the value determination and storage procedure, are usually produced in integrated circuits. The integrated circuits or the semiconductor chip that contains them are currently usually embedded in card-like data media for the purpose of better handling. In most cases, the value represents a monetary credit value that can only be reduced for example, in the case of telephone cards, but may also be increased again in the case of cash cards. Alternatively, the value may be the reading on an odometer in a vehicle, for example.

Published, Non-Prosecuted German Patent Application DE 36 38 505 A1 describes a value counter which is in the form of a volatile binary counter whose counter reading can be stored in nonvolatile form in an EEPROM after the data medium has been used. At the start of the data medium being used, the content of the EEPROM is transferred to the binary counter again as an initial counter reading. The counter can be operated only in the direction in which the value represented by the counter reading is reduced. Since the value of the data medium can thus not be increased, there is only a small incentive for manipulation by fraudulent parties.

A data medium described in International Patent Disclosure WO 96/10810 is intended to be rechargeable, and it should thus also be possible to increase its value. In this instance, the counter is formed using EEPROM memory cells, and is organized such that it operates as a multistage counter using the abacus principle. In order to rule out manipulation by changing the counter reading, two counters of identical construction are provided which are used alternately whenever the counter reading is increased. Although the counter configuration is very reliable, it requires a relatively large number of memory cells and thus has a high area requirement.

Published, European Patent Disclosure EP 0 398 545 A1 discloses an odometer which is likewise formed using a binary counter whose counter reading is stored in nonvolatile form in memory cells at regular intervals. Since it is not possible to erase and rewrite information to nonvolatile memory cells, particularly EEPROM cells, as often as desired, a number of identical memory areas are provided which are used successively, whenever the "life" of the previous memory area has come to an end. To distinguish the memory area that is current in each case, control memory cells are provided whose state is evaluated.

In the known counter, when there is a change of memory area, the new memory area is first erased. The current counter reading is then entered in the memory area. The associated control memory cell is subsequently programmed. Finally, the control memory cell for the old memory area is erased. A change of memory area requires a total of four erasing and programming operations to be carried out, which takes up a considerable amount of time. This presents a problem in an odometer in which a change of memory is necessary only after 20,000 km, for example.

This is not acceptable for telephone cards, however, in which each unit consumed necessitates a change of counter reading, and hence a change of memory area.

SUMMARY OF THE INVENTION

It is accordingly an object of the invention to provide a method for reliably changing a value stored in a nonvolatile memory, and a circuit configuration for this purpose, that overcome the above-mentioned disadvantages of the prior art methods and devices of this general type, which reliably changes a value stored in a memory, and an integrated circuit configuration for this purpose which, in the first instance, needs only a small number of nonvolatile memory cells, and, in the second instance, allows a rapid change of memory area.

With the foregoing and other objects in view there is provided, in accordance with the invention, a method for reliably changing a value of a data medium, which contains the steps of:

providing a memory having at least two nonvolatile memory areas for storing a currently valid value, each of the memory areas having at least one associated nonvolatile control memory cell whose state defines an associated one of the memory areas to be one of a valid memory area and an invalid memory area;

writing a current value to the invalid memory area;

erasing simultaneously a previously valid memory area and the associated nonvolatile control memory cell; and programming simultaneously with the erasing step, the associated nonvolatile control memory cell for a memory area of the main areas to which information has previously been written so that the memory area can be recognized as the valid memory area.

According to the invention, the current value, preferably the counter reading of a binary counter, is programmed in nonvolatile form in a memory area provided for this purpose. The memory area has at least one associated control memory cell whose charge state identifies the memory area as a currently inactive or invalid memory area. A further memory area stores the previously valid value, that is to say the previous counter reading, with the associated control memory cell identifying this memory area as the valid memory area.

After the current value or counter reading has been written to the (still) invalid memory area, the (still) valid memory area is erased and, according to the invention, the charge state of the associated control memory cell is changed, for example erased, simultaneously, so that the memory area is now indicated as being the invalid memory area. Likewise simultaneously, the charge state of the control memory cell for the memory area to which information has just been written is also changed, for example programmed, so that this memory area is identified as being the memory area which is now valid.

Thus, in the case of the method according to the invention, only two erasing and programming operations are required for each change of memory area. Before the memory area to which information has newly been written is distinguished as being valid, the correctness of the written value can be checked in a known manner, in order to prevent manipulation. The memory areas advantageously contain the same amount of cells as the value has places or as the counter representing the value has counter places.

In one preferred circuit configuration that allows the method to be carried out, each control memory cell memory transistor has two selection transistors connected in series with it. The selection transistors connect the source and the drain connection of the memory transistor to ground and to a bit line to which a programming voltage can be applied, respectively. The gate connections of the selection transistors are thus interconnected in such a way that one memory transistor is erased when the other is programmed. In addition, the control gates of the memory transistors in the control memory cells are connected to the control gates of the memory transistors in the associated memory areas in such a way that erasing one memory area results in the associated control memory cell also being erased.

With the foregoing and other objects in view there is provided, in accordance with the invention, an integrated circuit configuration, containing a memory. The memory includes at least two nonvolatile memory areas for storing currently valid values. The memory areas are formed of memory transistors having gate connections and drain connections. Nonvolatile control memory cells including a first control memory cell and a second control memory cell are provided. Each of the memory areas are connected to at least one of the control memory cells. The control memory cells have states defining a currently valid memory area of the memory areas. Each of the control memory cells have a control memory transistor with a drain connection, a source connection, and a control gate connection connected to an associated one of the gate connections of the memory areas. A first selection transistor is connected to the drain connection of the control memory transistor. The first selection transistor has a gate connection connected to the control gate connection of the control memory transistor of the other of the first and second control memory cells. A second selection transistor is connected to ground and to the source connection of the control memory transistor for connecting the source connection of the control memory transistor to ground. The second selection transistor has a gate connection connected to the control gate connection of the control memory transistor. A a bit line is connected to the drain connection of the control memory transistor of each of the control memory cells through the first selection transistor of each of the control memory cells.

Other features which are considered as characteristic for the invention are set forth in the appended claims.

Although the invention is illustrated and described herein as embodied in a method for reliably changing a value stored in a nonvolatile memory, and a circuit configuration for this purpose, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 a circuit diagram showing a detail of a nonvolatile mery having two memory areas according to the invention; and FIG. 2 is a table containing voltage values necessary for erasing and programming the memory areas.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a detail of an EEPROM memory having two memory areas Z1, Z2. The memory is organized in columns and rows, as is usual, with only two columns and two rows being shown in the example illustrated.

In this configuration, each memory cell SZ11 ... SZ22 is formed using a memory transistor ST having an insulated memory electrode and a selection transistor AT connected in series therewith. Source connections of the memory transistors ST can be connected to ground via a switching transistor T. The switching transistor T has a control connection S for this purpose.

The memory cells SZ11, SZ12; SZ21, SZ22 in the memory areas Z1; Z2 are each disposed in one row of the memory, so that they can all be erased, programmed or read simultaneously by addressing only one row. Drain connections of the selection transistors AT in the memory cells SZ11 ... SZ22 are connected to bit lines leading to bit line connections SP1, SP2. At the bit line connections SP1, SP2, either a stored state can be tapped off or voltages necessary for erasing/programming can be applied.

The programming, erasing and reading procedures for such EEPROM cells will be explained below using the example of the memory cell SZ11 in the first memory area Z1.

During programming, an insulated memory electrode (floating gate) of the memory transistor ST is positively charged. For this purpose, the control gate connection SG1 of the memory transistor ST is grounded and a high programming voltage of, for example, 20 volts is applied to the associated bit line connection SP1. The source connection of the memory transistor ST is left at a floating potential as a result of the switching transistor T being turned off. To be able to switch the high programming voltage to the drain connection of the memory transistor ST via the selection transistor AT in the memory cell SZ11, the high programming voltage must also be applied to the gate connection of the selection transistor AT. The positive charge on the insulated gate electrode shifts the threshold voltage of the memory transistor ST to negative values, so that the memory transistor ST is on, even with the control gate connection SG1 unconnected.

To erase the memory cell again, the high programming voltage Vp is applied to the control gate connection SG1 of the memory transistor ST, and the source connection of the memory transistor ST is grounded via the switching transistor T. In this way, the insulated gate electrode of the memory transistor ST is discharged again, which causes the individual voltage of the memory transistor ST to rise, so that the latter is off when the control gate connection SG1 is unconnected.

To read the charge state of the memory cell SZ11, the positive supply voltage Vcc of the integrated circuit containing the memory is applied to the gate connection AG1 of the selection transistor AT, so that the latter is on and the memory cell is consequently selected. Depending on whether or not the memory transistor ST is programmed, it will or will not be on. This can be detected on the bit line connection SP1.

As FIG. 1 shows, each memory area Z1; Z2 has a control memory cell KZ1; KZ2 associated with it. Each control memory cell is formed using a first selection transistor AT11; AT21, a memory transistor ST1; ST2 and a second selection transistor AT12, AT22, which are connected in series. A source connection of the second selection transistors AT12, AT22 is connected to ground. A drain connection of the first selection transistors AT11, AT21 is connected to a control bit line connection SPF via a control bit line.

Control gate connections of the memory transistors ST1, ST2 in the control memory cells KZ1, KZ2 are connected to the control gate connections SG1, SG2 of the memory transistors ST in the memory areas Z1, Z2. The gate connections of the first selection transistor AT11 in the first control memory cell KZ1 and of the second selection transistor AT22 in the second control memory cell KZ2 are connected to the control gate connection of the memory transistor ST2 in the second control memory cell KZ2. The gate connections of the second selection transistor AT12 in the first control memory cell AZ1 and of the first selection transistor AT21 in the second control memory cell KZ2 are connected to the control gate connection of the memory transistor ST1 in the first control memory cell KZ1.

The effect of this interconnection and connection, respectively, of the control memory cells among one another and to the memory areas is that, when a memory area Z1 or Z2 is erased, the associated control memory cell KZ1 or KZ2 is erased and the respective other control memory cell KZ2 or KZ1 is programmed simultaneously. To achieve this, there must be a high positive potential Vp on the control bit line connection SPF.

FIG. 2 shows a table containing the voltages to be applied to the significant connections AG1, SG1, AG2, SG2, SP1, SP2, SPF, S for the erasing and programming operations. The upper part of the table contains the voltages for a write operation in the second memory area Z2. In this case, the entry 0/Vp means that, depending on whether a logic 0 or a logic 1 is to be written, either ground potential or the positive programming voltage should be applied to the respective bit line connection. If there is no entry regarding the voltage of the gate connection AG1 of the selection transistors in the first memory area Z1 when the first memory area Z1 is being erased, this results in that the value of the voltage is not important for the erasing operation.

The table in FIG. 2 shows the case where, first, a current value is written to the second memory area Z2 and then the first memory area Z1 is erased and the associated control memory cells KZ1, KZ2 are programmed or erased. Accordingly, for storing the next value, information is first written to the first memory area Z1, and the second memory area Z2 is then erased and the control memory cells KZ2, KZ1 are recharged again, and so on. In this way, a new counter reading is always written first while the old counter reading is still retained and is erased only after writing has been successful, so that the risk of error is minimized.

The invention has been explained using an EEPROM memory having conventional memory cells constructed using a memory and a selection transistor. However, the invention can also be readily applied to, for example, flash EPROM memory cells, whose memory cells contain only one transistor. No illustration and explanation have been given of the switching a of voltages to the connections of the memory, nor of the connection of the outputs of a counter to the inputs of the memory, since the person skilled in the art is absolutely familiar with this. The whole procedure is controlled by a control device, which is either in hard-wired form as a special circuit, preferably on the same integrated circuit, or else is formed by a microprocessor. The person skilled in the art is familiar with the connection of the control device to a counter and to the circuit configuration according to the invention as well as the driving of these elements in accordance with the method of the invention.

I claim:

1. A method for reliably changing a value of a data medium, which comprises the steps of:

providing a memory having at least two nonvolatile memory areas for storing a currently valid value, each of the memory areas having at least one associated nonvolatile control memory cell whose state defines an associated one of the memory areas to be one of a valid memory area and an invalid memory area;

writing a current value to the invalid memory area;

erasing simultaneously a previously valid memory area and the associated nonvolatile control memory cell; and programming simultaneously with the erasing step, the associated nonvolatile control memory cell for a memory area of the memory areas to which information has previously been written so that the memory area can be recognized as the valid memory area.

2. An integrated circuit configuration, comprising:

a memory, including:

at least two nonvolatile memory areas for storing currently valid values, said memory areas formed of memory transistors having gate connections and drain connections;

nonvolatile control memory cells including a first control memory cell and a second control memory cell, each of said memory areas connected to at least one of said control memory cells, said control memory cells having states defining a currently valid memory area of said memory areas, each of said control memory cells having:

a control memory transistor with a drain connection, a source connection, and a control gate connection connected to an associated one of said gate connections of said memory areas;

a first selection transistor connected to said drain connection of said control memory transistor, said first selection transistor having a gate connection connected to said control gate connection of said control memory transistor of the other of said first and second control memory cells; and a second selection transistor connected to ground and to said source connection of said control memory transistor for connecting said source connection of said control memory transistor to ground, said second selection transistor having a gate connection connected to said control gate connection of said control memory transistor; and a bit line connected to said drain connection of said control memory transistor of each of said control memory cells through said first selection transistor of each of said control memory cells.

* * * * *